Sept. 18, 1928.

F. B. HAMBLIN 1,684,957

SCALE

Filed Sept. 30, 1926

Inventor:
Fred B. Hamblin,
by Rippey & Slingland.
His Attorneys.

Patented Sept. 18, 1928.

1,684,957

UNITED STATES PATENT OFFICE.

FRED B. HAMBLIN, OF ST. LOUIS, MISSOURI, ASSIGNOR TO THE WEIGHTOGRAPH COMPANY, OF ST. LOUIS, MISSOURI, A CORPORATION OF MISSOURI.

SCALE.

Application filed September 30, 1926. Serial No. 138,608.

This invention relates to scales, and more particularly to coin-controlled mechanism for personal weighing scales.

An object of the invention is to provide, in connection with a scale, a coin-controlled device for closing an electric circuit, together with means operated by the weighing mechanism for releasing the coin after each weighing operation.

Figure 1:
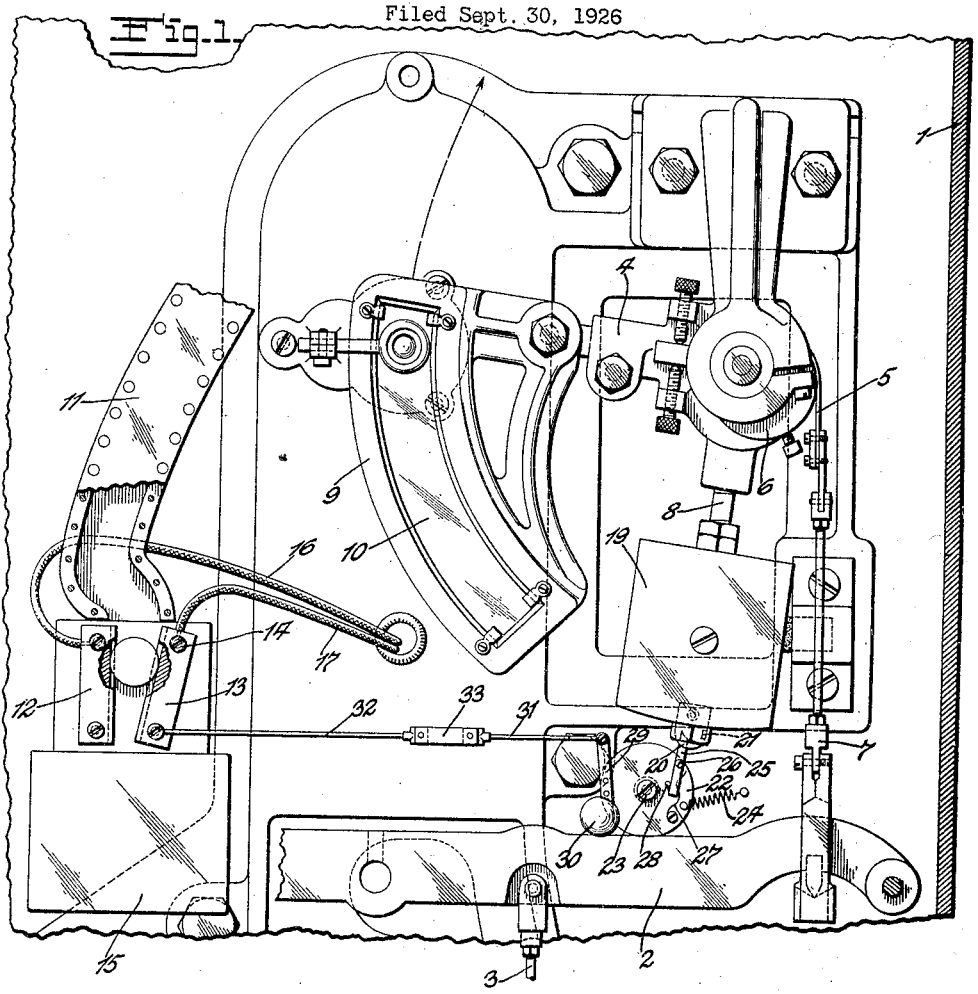

The invention further consists in novel details of construction hereinafter more fully described, reference being made to the accompanying drawing, in which, Fig. 1 is an elevation of the operating parts.

Figure 2:
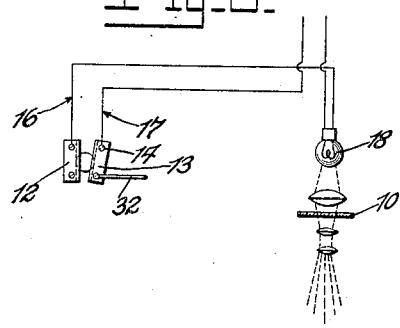

Fig. 2 is a diagram illustrating the electrical connections.

The device of the present invention is particularly applicable to the type of scale illustrated, for example, in the Schaper patent No. 1,402,970, dated January 10, 1922. The weighing mechanism and the weight indication of a scale of this structure are well understood and need only to be griefly described.

The mechanism is enclosed within a housing 1 and comprises a main scale beam 2 operated responsive to load on a scale platform (not shown), the load being transmitted to the main lever by the steelyard 3. The movement of the main beam is translated to an arcuate movement of an arm 4 pivoted for swinging movement by means of a flexible connection 5 over-riding a cam 6 and connected with the main scale beam by a connection 7. The load operates against a pendulum weight 8 that moves together with the arm 4 in an arcuate path inwardly from the position shown in Fig. 1 of the drawing, when the weight load is applied. The arm 4 carries an arcuate chart frame 9 and, by means of a projecting mechanism, chart, indicia carried by the chart 10 is projected upon a screen supported by any suitable part of the scale.

As above mentioned, this mechanism is well understood and constitutes no part of the present invention except in association with the construction about to be described.

The particular structure of the present invention includes a coin chute 11 having its upper throat available at any suitable point in connection with the scale mechanism for the insertion of the coin. Adjacent to the lower throat of the chute are contact members 12 and 13. The member 12 is permanently positioned in alinement with one wall of the outlet throat of the chute, but the member 13 is pivoted at its upper end so that its lower end swings toward and away from the member 12. The pivot point 14 for the member 13 is so positioned that the interval between the members 12 and 13 at their upper end is sufficient to admit therebetween a coin of a predetermined diameter; but the inner movement of the free end of the member 13 is sufficient to block the passage of the coin between said members when the free end of the member 13 is in its inner adjustment.

Below the lower ends of the members 12 and 13 is a tray 15 to receive the coin after it has passed between the members when the lower end of the member 13 is drawn away from the member 12 by the construction later to be described.

When a coin is dropped into the chute, it passes downwardly and is caught between the members 12 and 13 at a sufficient elevation to prevent the entry of another coin of equal diameter to the space between said members. The members 12 and 13 are of such a character as to constitute electrical conductors. They are arranged in an electrical circuit, as shown in the diagram in Fig. 2, each constituting a terminal for main leads 16 and 17 of an illuminating circuit, the illuminating element 18 of which, when energized, affords the illumination for the projecting system of lenses to throw the scale indicia onto the reading screen of the scale. Thus, it will be apparent that when a coin is inserted and finds its seat between the members 12 and 13, the electrical circuit for energizing the illuminating element will be closed.

In using the scale, the operator stands upon the platform and thereby imposes a pull upon the steelyard 3, drawing the lever 2 downwardly and, by reason of the connection with the pendulum 8, the pendulum is moved outwardly in the direction of the arrow (Fig. 1) and, at the same time, moves the chart frame in an arcuate path to center the proper scale indicia responsive to the load. The weight 19 of the pendulum arm has connected with its lower end and in longitudinal extension thereof a lug 20, which lug has extending forwardly therefrom at right angles a second lug 21.

Loosely supported below the lower end of the pendulum weight is a disc 22, said disc being carried by a pin 23 so that it is capable of a slight arcuate movement. Attached to the face of the disc and to a permanent part of the scale frame is a retractile spring 24 that tends to hold the disc in the position shown in Fig. 1.

Upon one face of the disc is a pawl 25 mounted on a pivot pin 26, said pawl being spring-pressed by a spring 27 against a pin 28 constituting an abutment and permitting the pawl to swing in one direction against the tendency of the spring 27 and to be held rigid with the disc when pressure is exerted on the opposite side thereof. When the pendulum weight swings to weighing position, the lug 21 rides over the upper beveled end of the pawl 25 without disturbing the position of the member 13. Upon the reverse movement of the pendulum, the lug 21 contacts with the upper end of the pawl and the tail of the pawl abuts against the detent, and the pressure of the weight 19 is sufficient to move the disc 22 clockwise, as viewed in Fig. 1 of the drawing, against the tendency of the spring 24.

On the opposite side of the disc and attached to the face thereof is an arm 29 constituting a pull lever and at the lower end of this arm is a counterweight 30 normally tending to restore the position of the disc to normal position. To the upper end of the arm 29 is connected a link formed of two sections 31 and 32, with an intermediate coupler 33 of electrical non-conducting material.

Obviously, as the disc is moved clockwise on the return of the pendulum weight, the upper end of arm 29 will be drawn inwardly toward the axis of the disc, thereby pulling the free end of the member 13 away from the member 12 and opening the space between said members, thereby releasing the coin by gravity into the tray 15. After the disc 22 has moved a sufficient distance for the lug 21 to clear the upper edge of the pawl 25, the pendulum weight will move over to the normal position shown in Fig. 1, and the parts will be restored by the weight 30, and the spring 24 to the normal position for the reception of the next coin during the subsequent operation of the scale. The purpose of the coupler 33 is obviously to prevent the flow of the current across the link connecting the member 13 with the arm 29.

From the foregoing, it will be understood that the construction provides an accurate coin-control that is effective for closing the illuminating circuit during the weighing operation and also one in which the coin is released without interfering with the normal operation of the type of pendulum scale with which it is particularly designed to be associated.

I am aware that the invention may be modified in various particulars without departing from the spirit and scope thereof, but what I claim and desire to secure by Letters Patent is:—

1. In a scale having a pendulum, a coin seat including members, one of which is relatively movable in respect of the other to engage and release the coin, an electric circuit closed across said members by the coin, and an actuator under control of the pendulum of the scale for moving one of said coin-engaging members to release the coin when the scale mechanism returns to normal position.

2. In a scale having a swinging weighted pendulum, a coin seat including members, one of which is relatively movable in respect of the other to engage and release the coin, an electric circuit closed across said members by the coin, and an actuator under control of the swinging weighted pendulum of the scale including a trip device and a connection for moving one of said coin-engaging members to release the coin when the scale mechanism returns to normal position.

3. In a scale, the combination with a weighted lever, of a coin seat including a stationary and a pivoted member operable to engage and release a coin, an electric circuit adapted to be closed across said coin seat when a coin is inserted therein a disc, a link between said disc and said pivoted member, and an abutment in connection with the weighted lever to operate said disc upon the return movement of the weighted lever, whereby the pivoted member is moved from the stationary member to permit the release of the coin.

4. In a scale, the combination with a weighted lever, of a coin seat including a stationary and a pivoted member operable to engage and release a coin, a disc, a link between said disc and said pivoted member, an abutment in connection with the weighted lever to operate said disc upon the return movement of the weighted lever, whereby the pivoted member is moved from the stationary member to permit the release of the coin, and an electric circuit adapted to be closed across said coin seat when a coin is engaged thereby.

5. In a scale, the combination with a pendulum, of a coin seat including a stationary and a pivoted member, a trip device operated by the swinging movement of the pendulum, a connection between said trip device and the free end of said pivoted coin seat member, and an electric circuit adapted to be closed across said coin seat when a coin is engaged thereby.

6. In a scale, the combination with a pendulum, of a coin seat including a stationary and a pivoted member, a trip device, an abutment on the pendulum for operating said trip device, a connection between said trip device and the free end of said pivoted coin seat member, and an electric circuit adapted to be closed across said coin seat when a coin is engaged thereby.

7. In a scale, a pendulum, a seat for receiving an insertable device including spaced members, one of which is relatively movable in respect to the other to engage and release said insertable device, an electric circuit adapted to be closed across said members when a device is inserted therebetween, and an actuator under the control of the pendulum of the scale for moving one of said spaced members to release the insertable device when the scale mechanism returns to normal.

8. In a scale, a chute for guiding an insertable device, a stationary contact member extending downwardly beyond the lower end of said chute, a pivot contact member opposite said stationary contact member and cooperating therewith to form a seat for the insertable device passing from said chute, an electric circuit adapted to be closed across said members by the insertable device passing from the chute to said seat formed by said members, a pendulum, and an actuator under control of said pendulum for controlling movement of said movable contact member to release the insertable device when the scale mechanism returns to normal position.

FRED B. HAMBLIN.